United States Patent [19]

Larson et al.

[11] Patent Number: 5,132,383
[45] Date of Patent: Jul. 21, 1992

[54] COPOLYMERS OF 3-METHACRYLOYLOXY-2-HYDROXYPROPYL TRIMETHYLAMMONIUM CHLORIDE MONOMER AND VINYL MONOMER

[75] Inventors: Eric H. Larson, Marcellus; Benjamin Shultes, III, Liverpool; William G. Chiang, Fayetteville, all of N.Y.

[73] Assignee: Polypure, Inc., Solvay, N.Y.

[21] Appl. No.: 456,339

[22] Filed: Dec. 26, 1989

Related U.S. Application Data

[63] Continuation-in-part of Ser. No. 278,301, Nov. 30, 1988, abandoned.

[51] Int. Cl.$^5$ .............................................. C08F 18/02
[52] U.S. Cl. ................................................ 526/292.2
[58] Field of Search ................. 526/292.2; 560/209, 560/223, 222

[56] References Cited

U.S. PATENT DOCUMENTS

| | | | |
|---|---|---|---|
| 3,059,024 | 10/1962 | Goldberg et al. | 260/486 |
| 3,321,649 | 5/1967 | De Benedictis et al. | 526/291 |
| 3,329,706 | 7/1967 | Sobolev | 560/222 |
| 3,397,227 | 8/1968 | Sobolev | 560/209 |
| 4,169,208 | 9/1990 | Kametani et al. | 560/222 |
| 4,374,206 | 2/1983 | MacDonald et al. | 521/38 |

FOREIGN PATENT DOCUMENTS

| | | | |
|---|---|---|---|
| 1593421 | 8/1966 | Fed. Rep. of Germany . | |
| 1112912 | 8/1964 | United Kingdom | 560/222 |
| 1140520 | 7/1966 | United Kingdom . | |

*Primary Examiner*—Joseph L. Schofer
*Assistant Examiner*—Alex H. Walker
*Attorney, Agent, or Firm*—Mathews, Woodbridge & Collins

[57] ABSTRACT

The present invention provides a copolymer comprising the polymerization product of two or more vinyl monomers wherein one of the monomers is a mixture of 3-methacryloyloxy-2-hydroxypropyltrimethylammonium halide and 2-methacryloyloxy-3-hydroxypropyltrimethylammonium halide salt. The copolymer has an intrinsic viscosity greater than about 5 dl/g. The preferred copolymer comprises the polymerization product of acrylamide and a mixture of 3-methacryloyloxy-2-hydroxypropyltrimethylammonium chloride and 2-methacryloyloxy-3-hydroxypropyltrimethylammonium chloride. The copolymers of the present invention are particularly useful as flocculants.

22 Claims, 3 Drawing Sheets

COPOLYMERS OF 3-METHACRYLOYLOXY-2-HYDROXYPROPYL TRIMETHYLAMMONIUM CHLORIDE MONOMER AND VINYL MONOMER

CROSS-REFERENCE TO RELATED APPLICATIONS

This application is a continuation in part of application Ser. No. 07/278,301 filed Nov. 30, 1988 now abandoned.

BACKGROUND OF THE INVENTION

1. Field of the Invention

This invention relates to copolymers of a mixture of 3-methacryloyloxy-2-hydroxypropyltrimethylammonium halide salt and its isomer, 2-methacryloyloxy-3-hydroxypropyltrimethylammonium halide salt, and other vinyl monomers. Preferably, the present invention provides copolymers of a mixture of 3-methacryloyloxy-2-hydroxypropyltrimethylammonium chloride and its isomer, 2-methacryloyloxy-3-hydroxypropyltrimethylammonium chloride, collectively known as MAHTAC, and other vinyl monomers.

2. Description of the Prior Art

The flocculation activity of copolymers of acrylamide and monomers containing cationic, quaternary nitrogen functionality has long been known and a wide body of literature covering the synthesis of cationic monomers and polymers exists, and in particular emulsion polymerization techniques leading to copolymers of acrylamide and these monomers. In particular, U.S. Pat. Nos. 3,284,393; 3,321,649; 3,329,706; 3,428,617; 4,077,930; 4,217,262; and Vanderhoff, J. W., et al., "Inverse Emulsion Polymerization". *Polymerization and Polycondensation Processes, Advances in Chemistry Series* 34, (1962), teach copolymers and the preparation thereof.

Acrylamide-MAHTAC copolymers are disclosed in U.S. Pat. Nos. 3,329,706 and 3,428,617. The polymers mentioned were taught to be particularly useful as additives to paper products to enhance properties such as wet strength and abrasion resistance. Activity in flocculation of biologically treated wastes was not disclosed. The references give several examples of the synthesis of copolymers of acrylamide and MAHTAC wherein the copolymers have an intrinsic viscosity range of 0.9 to 2.8 dl/g. This viscosity range corresponds to a molecular weight range that is too low to provide flocculation activity competitive with copolymers of acrylamide and common, commercially available monomers, such as acryloyloxyethyltrimethylammonium chloride, which are produced by conventional transesterification synthesis routes.

U.S. Pat. No. 3,321,649 teaches a flocculating agent of a mixture of (a) a water soluble cationic polymer of 3-methacryloyloxy-2-hydroxypropyltrimethylammonium chloride and a dissimilar monomer having at least one ethylenic linkage, and (b) a polyacrylamide. Although the reference teaches that water soluble cationic polymers with an intrinsic viscosity of about 0.5 to 10 dl/g are desirable, the highest intrinsic viscosity for a copolymer (Example 1) is only 2.8 dl/g.

U.S. Pat. Nos. 4,077,930 and 4,217,262 cite the MAHTAC monomer as being suitable for use in formulations intended for flocculation applications. However, there are no specific examples where this particular monomer is actually used and this monomer is not currently commercially available.

It would be desirable to have MAHTAC based copolymers wherein the viscosity of the copolymers is higher than that of known products having MAHTAC therein so that they may be used as flocculants in waste water treatment applications.

As such, the present invention fulfills the need in the art for MAHTAC based copolymers wherein the viscosity of the copolymers is higher than that of known products.

Other advantages of the present invention will become apparent from the following description, attached drawings and appended claims.

SUMMARY OF THE INVENTION

In accordance with this invention there is provided a copolymer useful in flocculating waste water comprising the polymerization product of two or more vinyl monomers wherein one of said monomers is a mixture of 3-methacryloyloxy-2-hydroxypropyltrimethylammonium halide salt and 2-methacryloyloxy-3-hydroxypropyltrimethylammonium halide salt, said copolymer having an intrinsic viscosity greater than about 5 dl/g and the halide salt mixture prepared by the process comprising the steps of:

(a) reacting an acid of the formula $CH_2=C(R)COOH$ wherein R is selected from the group consisting of H and alkyl of 1 to 4 carbon atoms and epihalohydrin in the presence of a first catalyst at a temperature and for a time sufficient to form a reaction product, the molar ratio of acid to epihalohydrin is about 0.5:1.0 to about 1.0:0.5; and (b) reacting said reaction product with a trialkylamine in the presence of a catalytic amount of a catalyst containing an epoxy functional group with the reaction taking place at a temperature and for a time sufficient to yield the monomer product $CH_2=C(R)COOCH_2C(OH)HCH_2N^+(R'R''R''')Cl^-$ and its isomer $CH_2=C(R)COOCH(CH_2OH)CH_2N^+(R'R''R''')Cl^-$ wherein R is as defined above, R', R'', and R''' are each an alkyl group, said reaction being carried out in a nonsolvent for the monomer product and its isomer.

DETAILED DESCRIPTION OF THE PREFERRED EMBODIMENTS

Figure 1:
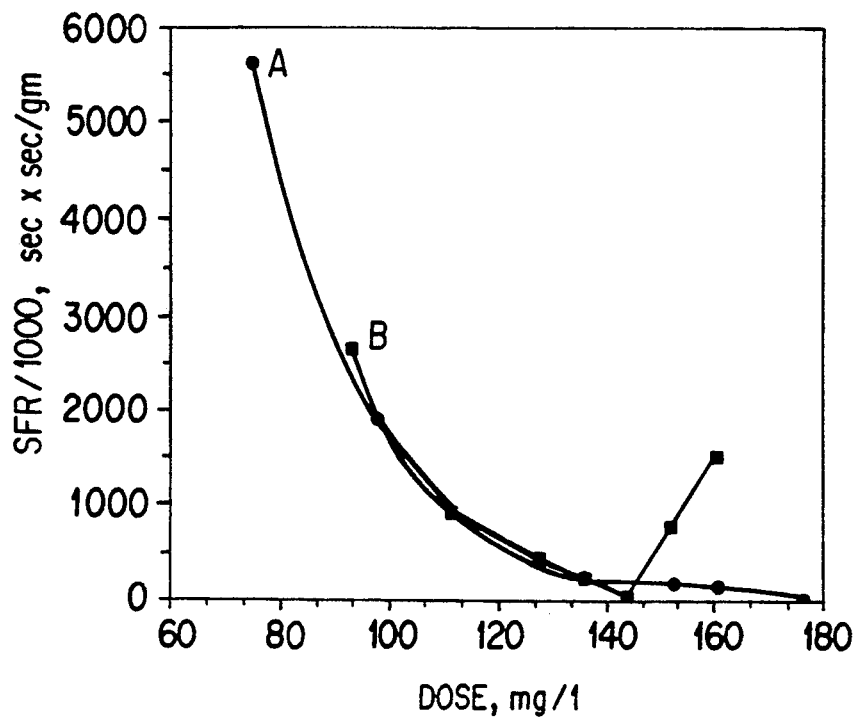
FIGS. 1-5 illustrate the flocculation activity of copolymers of the present invention compared to that of known flocculants.

The present invention provides a copolymer comprising the polymerization product of two or more vinyl monomers. One of the monomers is a mixture of 3-methacryloyloxy-2-hydroxypropyltrimethylammonium salt and 2-methacryloyloxy-3-hydroxypropyltrimethylammonium salt. The term "copolymer" as used herein means a copolymer having at least two different monomers therein This copolymer has an intrinsic viscosity greater than about 5 dl/g.

The present copolymers are of high molecular weight as indicated by the high intrinsic viscosity, and also, the copolymers are sufficiently linear so that they are particularly useful as flocculants in waste water treatment applications. It has been found that the present preferred copolymers of MAHTAC and acrylamide have greater flocculation activity compared to copolymers of acrylamide and methacryloyloxyethyltrimethylammonium chloride which is commercially known as Q-6. Because the MAHTAC monomer used herein shows improved resistance to hydrolysis compared to other quaternary monomers, the present copolymers also have improved storage stability and potentially higher performance in high pH wastes.

The present invention also provides a method of separating aqueous suspensions containing finely divided materials. The method comprises the step of: adding a flocculant to the suspension wherein the flocculant comprises a copolymer comprising the polymerization product of two or more vinyl monomers. One of the monomers is a mixture of 3-methacryloyloxy-2-hydroxypropyltrimethylammonium salt and its isomer 2-methacryloyloxy-3-hydroxypropyltrimethylammonium salt. The copolymer has an intrinsic viscosity greater than about 5 dl/g.

The present copolymer comprises two or more vinyl monomers wherein one of the monomers is preferably MAHTAC. MAHTAC and its isomer are the preferred monomer product embraced by the formulas:

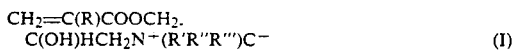

and its isomer

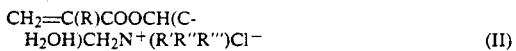

wherein:

R is selected from the group consisting of H and alkyl of 1 to 4 carbon atoms, and R', R" and R''' are each an alkyl group.

To make desired copolymers of very high molecular weight, the monomers of formulas I and II must be very pure. Such monomer may be obtained by subsequent purification of the monomer by published methods, for instance, see U.S. Pat. No. 3,329,766. The purification method could be a combination of well known methods such as recrystallization combined with activated carbon absorption. However, the yields are so poor, in general, that preparation of polymers from such monomer is not practical in a commercial sense for presently known applications.

The preferred method for preparation of these monomers is a two-step process. With respect to MAHTAC the process is: (i) direct reaction of epichlorohydrin and methacrylic acid to produce a mixture of 3-chloro-2-hydroxypropyl methacrylate and its isomer, 1-chloro-3-hydroxypropyl-2-methacrylate and (ii) the reaction of the product of step (i) with trimethylamine in a non-solvent for the monomer such as acetonitrile. The monomer, 3-methacryloyloxy-3-hydroxypropyltrimethylammonium chloride and its isomer, 2-methacryloyloxy-3-hydroxypropyltrimethylammonium chloride, precipitates out of the non-solvent as it is formed leaving behind various impurities. In order to obtain the high molecular weight polymers of this invention even this relatively pure monomer may require further purification by either one or a combination of the following well known methods: recrystallization, absorption of impurities from aqueous solution by activated carbon or other absorbency, extraction or extensive washing of the crystals.

In step (i) methacrylic acid (MAA) and epihalohydrin are preferably reacted in the presence of a catalyst. Preferred epihalohydrins are epichlorohydrin, epibromohydrin and epifluorohydrin. The most preferred epihalohydrin is epichlorohydrin.

Preferably, the molar ratio of methacrylic acid used to epihalohydrin is about 0.5:1.0 to about 1.0:0.5. More preferably, the molar ratio is about 0.8:1.0 to about 1.0:0.8 and most preferably the molar ratio is about 0.9:1.0 to about 1.0:1.0 The use of a slight excess of epihalohydrin is most preferred.

Preferably, the catalyst is selected from the group consisting of tertiary amines, quaternary ammonium salts, anion exchange resins, sulfides, sulfonium salts, and chromium compounds. Preferred tertiary amines are of the formula $R_1R_2R_3N$ where $R_1, R_2$ and $R_3$ are selected from the group consisting of alkyl, aryl, alkaryl, aralkyl, alkylhydroxy and heterocyclic. Preferred trialkylamines are pyridine, trimethylamine (TMA), triethylamine (TEA), and tributylamine (TBA). Triethylamine is most preferred.

Preferably, the molar ratio of catalyst to methacrylic acid is about 0.01:1.0 to about 0.2:1.0. More preferably, the molar ratio is about 0.01:1.0 to about 0.1:1.0 and most preferably is about 0.02:1.0 to about 0.04:1.0.

The methacrylic acid and epihalohydrin are preferably reacted in the presence of the catalyst at a temperature and for a time sufficient to form a reaction product. The temperature is about 25° to about 100° C.; more preferably, the temperature is about 50° to about 100° C. and most preferably about 70° to about 90° C. Preferably the reaction time is about 2 to about 48 hours and more preferably about 3 to about 24 hours. Reaction pressure should be atmospheric.

Preferably the reaction occurs in the presence of a polymerization inhibitor. Preferred polymerization inhibitors are p-methoxyphenol, hydroquinone and phenothiazine; these materials are available in commercial quantities. The polymerization inhibitors may be used in conventional amounts.

For step (ii) purification of the 3-chloro-2-hydroxypropyl methacrylate (CHPM) solution from step (i) before the quaternization may not be necessary. The reaction product of step (i) is preferably reacted with trimethylamine to form 3-methacryloyloxy-2-hydroxypropyltrimethylammonium chloride and its isomer, 2-methacryloyloxy-3-hydroxypropyltrimethylammonium chloride monomer. The molar ratio of the reaction product to the trimethylamine is about 1.0:1.0 to about 1.0:2.0 and preferably about 1:1.00 to about 1:70.

The nature of the reaction medium affects the reaction rate and yield of the MAHTAC reaction. Since the reaction between two neutral species leads to ionic products, the rate is enhanced by ionizing media like polar solvent. Unfortunately, polar protic media like water promote side reactions such as hydrolysis and transesterification, particularly in the basic environment created by the presence of trimethylamine. Media like low molecular weight alcohols become involved in transesterification reactions with the reactants and products and are also not useful. Poorly ionizing or nonionizing media like ethers and hydrocarbons result in very slow reactions.

A useful solvent would be polar but aprotic—a solvent for the CHPM but a poor solvent for the MAHTAC (about 3% at room temperature). The term "non-solvent" is used herein to mean that the MAHTAC monomer is soluble in the non-solvent only up to about 3% at room temperature.

Preferred polar aprotic solvent "non-solvents" include tetrahydrofuran, acetone, acetonitrile, propionitrile, butyronitrile, dimethyl formamide, dimethyl sulfoxide, methyl ethyl ketone, ethylacetate and 1,1,2-trichloroethene. The more preferred nonsolvents are acetonitrile, acetone, methyl ethyl ketone, tetrahydrofuran, ethylacetate and 1,1,2-trichloroethene. The most preferred non-solvent is acetonitrile. The solvent is used in an amount of about 35 to about 85 weight percent.

It has been unexpectedly found that the rate of formation of MAHTAC can be accelerated by the presence of a component with an epoxy functional group. Although not wishing to be bound by theory, MAHTAC may be formed by at least two mechanisms. One is the direct alkylation of trimethylamine by chlorine containing functional group of the CHPM molecule yielding a quaternary ammonium chloride. The second involves the formation of glycidylmethacrylate from CHPM which is then attacked by the nucleophilic trimethylamine. In the process, MAHTAC is formed and a new molecule of glycidylmethacrylate is generated from CHPM. This process is repeated over and over until the reactants are consumed or the reaction stopped. This reaction is much faster than the direct alkylation. The overall reaction follows the scheme:

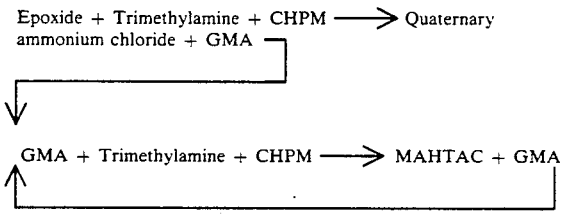

Many compounds with an epoxy functional group may react with trimethylamine to initiate this cycle. For example, a small amount of epichlorohydrin may react with the trimethylamine to yield glycidyltrimethylammoium chloride and in the process, one molecule of CHPM would be converted to GMA. Suitable compounds may be selected from the group

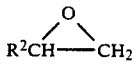

where $R^2$ is selected from the group consisting of hydrogen, an alkyl or alkenyl group of 1 to 10 carbon atoms, an alkararyl or aralkyl group of 7 to 11 carbons, amine or trimethylammonium ion. Other suitable compounds include, but are not limited to, glycidyl acrylate, glycidyl methacrylate (GMA), allyl glycidyl ether, glycidyl trimethylammonium chloride, propylene oxide and epichlorohydin. The higher the ratio of the epoxy containing "catalyst" to CHPM, the faster the reaction proceeds. Preferred ratios range from 0.001:1.0 to about 0.1:1.0. More preferably, the ratio is from 0.01:1.0 to 0.08:1.0.

Water plays an important role in the MAHTAC monomer synthesis because the monomer is hygroscopic and water promotes side reactions. It has been found that the shelf life of the CHPM solution decreased significantly when moisture was present. Trace water promotes hydrolysis and transesterification reactions in the basic environment.

The reaction product from step (a) is reacted with trimethylamine at a temperature and for a time sufficient to form 3-methacryloyloxy-2-hydroxypropyltrimethylammonium chloride. A pressure vessel should be used. Preferably, the reaction temperature is about 25° to about 90° C.; more preferably about 50° to about 85° C. and most preferably about 55° to about 70° C. The reaction time is about 2 to about 48 hours and preferably about 3 to about 25 hours.

Preferably the reaction occurs in the presence of a polymerization inhibitor. Preferred polymerization inhibitors are p-methoxyphenol, hydroquinone, and phenothiazine; these materials are available in commercial quantities. The polymerization inhibitors may be used in conventional amounts.

The purified MAHTAC type monomer mixture is polymerized with at least one other vinyl monomer under conditions of free radical formation. The new polymers may be prepared by a variety of polymerization techniques, including solution, suspension, gel phase and emulsion polymerization. Free radical initiators such as benzoyl peroxide, hydrogen peroxide, potassium persulfate, potassium permaganate, alkali perborates, teritary butyl peracetate, tertiary alkyl hydroperoxides, peroxy diesters, azo initiators such as 2,2'-azobis (4-methoxy-2,4-dimethylvaleronitrile), 2,2'-azobis (2-methylpropane); and 2,2'-azobis (2-amidinopropane) dihydrochloride may be used. Other free radical forming conditions such as exposure to ultraviolet light, gamma radiation or other forms of ionizing radiation are also suitable.

Preferably the other vinyl monomer(s) used include acrylamide, substituted acrylamides such as methacrylamide, N,N-dimethyl acrylamide, 3-acrylamide-3-methylbutanoic acid, and the salts thereof; vinyl carboxylic acids such as acrylic acid, methacrylic acid and the salts thereof, such as lithium acrylate; vinyl esters of amino alcohols, and the acid salts or quaternization products thereof such as acryloyloxyethyldimethyl amine, acryloyloxyethyldimethyl amine hydrochloride, methacryloyloxyethyldimethyl amine hydrochloride, and the benzyl chloride salt of acryloyloxyethyldimethyl amine; divinyl compounds that can participate in addition polymerization via ring closing mechanisms, such as dimethyldiallylammonium sulfate and other salts thereof, and the corresponding amines; acrylamide alkyl amines and the hydrochloride or quaternary salts thereof such as methacrylamidopropyldimethylamine, acrylamidopropyltrimethylammonium chloride; 2-acrylamide-2-methylpropanesulfonic acid and salts thereof such as potassium 2-acrylamido-2-methylpropanesulfonate; acrylic esters of alkyl and aryl alcohols such as lauryl methacrylate, stearic methacrylate and oleic acrylate; vinyl acetate, vinyl propionate and higher alkyl analogs of vinyl acetate. The most preferred vinyl monomer is acrylamide.

Some preferred methods of copolymerization include conventional polymerization techniques such as solution, suspension and emulsion polymerization. Water may be removed after the polymerization is complete yielding a concentrated liquid form or a solid form of the polymer. Alternatively, the polymer may be sold or used in its original liquid form.

Solution copolymerization techniques involve preparation of a solution of the comonomers, addition of buffers, chelants, molecular weight controlling agents and other polymerization modifiers. This solution is then brought to the desired temperature as determined by the initiator, reaction time, residual monomer requirements and desired final molecular weight. The solution is then de-oxygenated and subjected to free radical forming conditions either by addition of a free radical forming substance, exposure to heat or radiation or a combination thereof. The presence of sufficiently energetic free radicals causes the formation of a statistical copolymer of the feed monomers. Gel phase polymerizations represent an extreme case of solution polymerizations, where the concentration of monomers is high enough to produce an extremely viscous final solution of polymer. The viscosity of these gel products is sufficiently high so that they have the physical characteristics of a rubber-like material while they retain complete water solubility upon dilution.

Suspension and emulsion copolymerizations share many common features. Both techniques are carried out in dispersed phase systems where the aqueous phase containing the water soluble vinyl monomer is dispersed in a non-polar liquid such as xylene. The non-polar liquid is a non-solvent for both the monomers and product copolymers so the actual polymerization takes place in the dispersed droplets of water which contains the feed monomers and the final product copolymer. Suspension polymerizations are typically used where a solid final product is desired and the copolymer is recovered from the emulsion by means such as azeotropic distillation of water and a cosolvent, followed by filtration of the dry polymer beads from the emulsion. In these cases of suspension polymerization, the size of the aqueous phase droplets is typically on the order of a millimeter in diameter.

Emulsion polymerizations are typically used when the final product to be sold is liquid in form. This product is essentially the reaction mass which is copolymer in water droplets dispersed in a hydrophobic liquid. Additives, such as surfactants to aid in the release of polymer in the end use application, are preferably added after the reaction of monomer to copolymer. Emulsion aqueous phase droplet sizes are, in contrast to suspension aqueous phase droplet sizes, on the order of 1 micrometer in diameter to insure the physical stability of the product in storage. Water may or may not be removed by azeotropic distillation as a post reaction step to increase the concentration of polymer in the final product. Emulsion polymerization is preferred in the present invention.

The preparation of suspension or emulsion copolymers is generally performed using the following procedure:

1. Combination of all the aqueous phase ingredients into one vessel.
2. Combination of all the oil phase ingredients into another vessel.
3. Addition of the aqueous phase to the oil phase accompanied by mixing.
4. In the case of emulsions, homogenization or high shear mixing may be used to reduce the water droplet size in the resulting mixture. Preferably the resulting mixture is the hydrophobic liquid containing water droplets wherein the water droplets contain the monomer.
5. De-oxygenation, most preferably by sparging inert gas such as nitrogen or argon through the suspension or emulsion.
6. Subjecting the suspension or emulsion to free radical forming conditions with controlled temperature, for a period long enough to convert the monomers to copolymers.
7. Post processing such as removal of water, or addition of finishing ingredients.

Preferably the present copolymers have two or three different monomers therein. Preferably the copolymer comprises 1 or more percent of the MAHTAC mixture based on the weight of the copolymer. More preferably the copolymer comprises 5 or more percent of MAHTAC based on the weight of the copolymer. Most preferably the copolymer comprises about 5 to about 95 percent of the MAHTAC mixture based on the weight of the copolymer.

The present copolymers are high molecular weight linear copolymers. The molecular weights obtained are determined by measurement of the intrinsic viscosity of the copolymers. Intrinsic viscosities are measured using a Schott AVS automated viscometer with an Ubbelohde capillary in 1N $NaNO_3$ solution or by using a known correlation between bulk viscosity results measured with a Brookfield LVT viscometer equipped with a ULV sample adapter at 60 RPM at 0.1% polymer concentration, again in 1N $NaNO_3$ solution and intrinsic viscosity.

The present copolymers have an intrinsic viscosity greater than about 5 dl/g. Preferably the copolymers have an intrinsic viscosity greater than about 6 dl/g. More preferably the copolymers have an intrinsic viscosity greater than about 9 dl/g. Most preferably the copolymers have an intrinsic viscosity greater than about 12 dl/g.

The present copolymers are useful for viscosity modifiers, coagulation, flocculation or sedimentation of suspended solids. Industries where such uses are important include process water preparation or waste water treatment. Such polymers are used in the paper industry as retention aids, paper size and coating modifiers, and wet and dry strength modifiers. Other applications include yarn lubricants, antistatic coatings, personal care products, including shampoos and soaps, industrial cleaners, biocides, adhesives, friction reducers, emulsion and reverse emulsion breakers, floatation aids, mineral processing aids, production of electrically conductive paper, steric stabilizers and surfactants and filtration enhancement.

The present copolymers are particularly useful as flocculants. Flocculants are added to suspensions and cause the individual particles to aggregate. This reduces the holding time in settling tanks before decantation of the liquid is performed. Filtration of such suspensions is frequently aided by flocculant addition so as to avoid the rapid development of an impermeable filter cake through which filtration is effected only at extremely low rates. The present preferred copolymers of MAHTAC and acrylamide have surprisingly increased flocculation activity when compared to copolymers of conventional monomers such as methacryloyloxyethyltrimethylammonium chloride and acrylamide.

The present invention is more fully illustrated by the following non-limiting examples in which, unless otherwise specified all temperatures are expressed as degrees Celsius and all parts are parts by weight.

EXAMPLES

Background

EXAMPLE A

Preparation of MAHTAC monomer

To a 500 ml 3-necked round bottomed flask equipped with a thermometer, air driven agitator and reflux condenser is charged 172.31 grams (2 moles) of methacrylic acid, 194.40 grams (2.1 moles) of epichlorohydrin, 0.86 gram (0.5 weight percent of methacrylic acid) of p-methoxy hydroquinone (MEHQ) as polymerization inhibitor, and 7.43 grams (0.04 mole) of benzyltriethylammonium chloride as catalyst. The reaction mixture is heated to 85° C. and a significant exotherm is observed when the reaction temperature reached 85° C. The reaction mixture is maintained at this temperature for another five hours. A clear pale yellow liquid is the final product. The yield is 95% based on methacrylic acid concentration.

Gas chromatographic analysis shows the reaction mixture is 88.27% 3-chloro-2-hydroxypropyl methacrylate and its isomer 1-chloro-3-hydroxypropyl-2-methacrylate.

To a 500 ml Fischer & Porter pressure bottle equipped with a magnetic stirrer is charged 150.03 grams (0.746 mole) of the above unpurified monomer solution, 154.05 grams of acetonitrile, 0.2 gram of MEHQ as polymerization inhibitor and 49.5 grams (0.837 mole) of trimethylamine. The bottle is sealed and heated in an oil bath at 65° C. for 10 hours. The reaction mixture starts to turn cloudy after 30 minutes of stirring. The reaction mixture is filtered and dried through a Buchner funnel. The yield of product, 3-methacryloyloxy2-hydroxypropyltrimethylammonium chloride, is 98.23% of theory. The melting point of the MAHTAC crystals is 180°-182° C.

Liquid chromatography analysis shows the product is comprised of 94.9% MAHTAC monomer. An aqueous solution of this monomer is purified by filtration through activated carbon.

THIS INVENTION

EXAMPLE I

In this example an acrylamide-MAHTAC copolymer is prepared by solution polymerization. MAHTAC as prepared in Example A above is used in the polymerization.

To a 1 pint square bottle are charged:

|  | grams |
|---|---|
| 50% acrylamide in water solution | 8.0 |
| 60% MAHTAC solution in water | 18.33 |
| 1% Versenex ® 80 | 0.24 |
| Succinic Acid | 1.0 |
| Deionized water | 272.42 |
| Wako ® VAO44 | 0.040 |

Versenex® 80 is diethylene triamine pentaacetic acid, pentasodium salt, 40% in water supplied by Dow Chemical, Midland, Michigan. Wako® VA044 is 2,2'-azobis(N,N'-dimethylene isobutyramidine) dihydrochloride supplied by Wako Chemicals USA, Dallas, Tex.

This solution is purged with nitrogen at or near 70° F. (21° C.) for 24 hours. A viscous liquid containing approximately 5% copolymer acrylamide-MAHTAC with an intrinsic viscosity of 6.0 dl/g is recovered. The product contains 45% mole of MAHTAC.

EXAMPLE 2

In this Example acrylamide-MAHTAC copolymer is prepared by emulsion copolymerization.

A reaction vessel is charged with:

|  | Parts |
|---|---|
| Hydrocarbon solvent (Chevron ® 450) | 150 |
| Siponic ® L7-90 | 3.85 |
| Span ® 80 | 13.65 |
| 50% Acrylamide solution | 117.15 |
| Distilled water | 40 |
| Succinic acid | 4.0 |
| Triton ® N-101 | 18.25 |
| MAHTAC (60% solution) | 267.4 |
| Versenex ® 80 | 0.030 |
| Vazo ® 52 | 0.012 |

Chevron ® 450 is refined petroleum distillate supplied by Chevron USA, Inc., San Francisco, California. Siponic ® L7-90 is ethoxylated lauryl alcohol supplied by Alcolac, Baltimore, Md. Span ® 80 is Sorbitan monooleate supplied by ICI Americas, Wilmington, Del. Triton ® N-101 is ethoxylated nonylphenol supplied by Rohm & Haas, Philadelphia, Pa. Vazo ® 52 is 2.2'-azobis(2,4-dimethyl valeronitrile) supplied by E. I. duPont de Nemours and Co., Wilmington, Del.

The intrinsic viscosity of the polymer recovered is determined to be 9.5 dl/g.

When gram quantities are used the above formulation can be conveniently processed in a one liter jacketed, agitated, resin flask equipped with an inert gas purge. The reactor temperature is controlled through the use of tempered water circulated through the jacket.

To perform the synthesis, the following steps are performed:
1. The hydrocarbon solvent, Siponic ® L7-90, and Span ® 80 are blended in a container large enough to hold the entire batch contents. This constitutes the oil phase.
2. The remaining components, excluding the Vazo ® 52 are blended in a separate container. This constitutes the aqueous phase.
3. Under conditions of good mixing the aqueous phase is gradually added to the oil phase.
4. The resulting crude water-in-oil emulsion is then homogenized using high shear mixing to reduce water droplet particle size.
5. The resulting monomer emulsion is them added to the reaction vessel, brought to the desired reaction temperature (which is a function of the amount and type of initiator used, preferably in the range of 40° to 60° C.) and purged with inert gas such as nitrogen. At this point, the Vazo ® 52 is added and the reactor refluxed for 5 hours.
6. After the reaction is completed the Triton ® N-101 is gradually added to the reaction mass under conditions of good mixing.
7. The resulting emulsion form of acrylamide-MAHTAC copolymer is then recovered from the reaction vessel.

EXAMPLE 3

The method of Example 2 is repeated to form a copolymer of acrylamide and MAHTAC with (a lower mole ratio of MAHTAC monomer than Example 2) of 25 mole percent MAHTAC monomer.

The ingredients charged to the reaction vessel are:

|  | Parts |
|---|---|
| Hydrocarbon solvent (Chevron ® 450) | 150 |
| Brij ® 30 | 3.85 |
| Span ® 80 | 13.65 |

| | Parts |
|---|---|
| 50% Acrylamide solution | 170.4 |
| Distilled water | 80. |
| Succinic acid | 4.0 |
| Triton ® N-101 | 17.8 |
| MAHTAC (60% solution) | 158.5 |
| Versenex ® 80 | 0.043 |
| Vazo ® 52 | 0.012 |

Brij ® 30 is ethoxylated lauryl alcohol supplied by ICI Americas, Wilmington, Del. The intrinsic viscosity of the recovered polymer is 12.6 dl/g.

EXAMPLE 4

The method of Example 2 is used to perform a copolymerization of acrylamide and MAHTAC. The resulting polymer contained a lower mole ratio of cationic/nonionic monomer than Example 2 at 10 mole percent MAHTAC cationic monomer.

The ingredients charged to the reaction vessel are:

| | Parts |
|---|---|
| Hydrocarbon solvent (Chevron ® 450) | 150 |
| Brij ® 30 | 3.85 |
| Span ® 80 | 13.65 |
| 50% Acrylamide solution | 227.5 |
| Distilled water | 80 |
| Succinic acid | 4.0 |
| Triton ® N-101 | 17.2 |
| MAHTAC (60% solution) | 78.5 |
| Versenex ® 80 | 0.057 |
| Vazo ® 52 | 0.012 |

The intrinsic viscosity of the polymer is 12.43 dl/g.

EXAMPLE 5

The method of Example 2 is used to perform a four component copolymerization of methacryloyloxyethyltrimethylammonium chloride, acryloyloxyethyltrimethylammonium chloride, acrylamide and MAHTAC.

The ingredients charged to the reaction vessel are:

| | Parts |
|---|---|
| Hydrocarbon solvent (Chevron ® 450) | 150 |
| Siponic ® L7-90 | 3.85 |
| Span ® 80 | 13.65 |
| Triton ® N-101 | 15.3 |
| Versenex ® 80 | 0.12 |
| Vazo ® 52 | 0.0262 |
| Deionized Water | 64.5 |
| Acrylamide (50% aqueous solution) | 170.4 |
| Methacryloyloxyethyltrimethylammonium chloride (75% aqueous solution) | 20.7 |
| MAHTAC (65% aqueous solution) | 54.9 |
| Acryloyloxyethyltrimethylammonium chloride (75% aqueous solution) | 19.35 |

The resulting four component polymer has an intrinsic viscosity of 11.5 dl/g.

EXAMPLE 6

The method of Example 2 is used to perform a terpolymerization of acrylamide, MAHTAC and methacryloyloxyethyltrimethylammonium methylsulfate.

| | Parts |
|---|---|
| Hydrocarbon solvent (Chevron ® 450) | 150 |
| Siponic ® L7-90 | 3.85 |
| Span ® 80 | 13.65 |
| Triton ® N-101 | 15.75 |
| Versenex ® 80 | 0.12 |
| Vazo ® 52 | 0.0262 |
| Deionized Water | 66.45 |
| Acrylamide (50% aqueous solution) | 149.1 |
| Methacryloyloxyethyltrimethylammonium methylsulfate (80% aqueous solution) | 49.5 |
| MAHTAC (65% aqueous solution) | 76.8 |

The intrinsic viscosity of the resulting terpolymer is 9.13 dl/g.

EXAMPLE 7

The method of Example 2 is used to perform a terpolymerization of acrylamide, MAHTAC and methacrylamidopropyltrimethylammonium chloride.

The ingredients used are:

| | Parts |
|---|---|
| Hydrocarbon solvent (Chevron ® 450) | 150 |
| Siponic ® L7-90 | 3.85 |
| Span ® 80 | 13.65 |
| Triton ® N-101 | 15.15 |
| Versenex ® 80 | 0.12 |
| Vazo ® 52 | 0.0262 |
| Deionized Water | 54.9 |
| Acrylamide (50% aqueous solution) | 199.9 |
| Methacrylamidopropyltrimethylammonium chloride (50% aqueous solution) | 14.1 |
| MAHTAC (65% aqueous solution) | 58.5 |

The intrinsic viscosity of the resulting terpolymer is 12.7 dl/g.

Examples 8 through 10 below show the utility of the copolymers of this invention and compare these polymers against previously known flocculants.

EXAMPLE 8

The flocculation activity of the polymers prepared in Examples 1 through 4 is compared to commercially available flocculants manufactured by similar processes using methacryloyloxyethyltrimethylammonium chloride and acrylamide as the comonomers. Clarifloc ® C-310, a copolymer of methacryloyloxyethyltrimethylammonium chloride and acrylamide, formerly supplied by Allied-Signal Inc. and now supplied by Polypure Inc., is used as a standard of comparison with Examples 1 and 2. Clarifloc ® C-330, copolymer of methacryloyloxyethyltrimethylammonium chloride and acrylamide, with 25 mole percent cationic monomer formerly supplied by Allied-Signal Inc., and now supplied by Polypure Inc., is used as a standard of comparison with Example 3. Clarifloc ® C-320, a copolymer of methacryloyloxyethyltrimethylammonium chloride and acrylamide, with 10 mole percent cationic monomer formerly supplied by Allied-Signal Inc., and now supplied by Polypure Inc., is used as a standard of comparison with Example 4.

The flocculation activity of the polymers prepared in Examples 1 through 4 are compared using anaerobic digested sewage obtained from the Ononadaga County Waste Water Treatment Plant located on Hiawatha Boulevard, in Syracuse, N.Y.

Flocculation activity is measured using the specific filter resistance (SFR) test. For more information on this test, see U.S. Pat. No. 4,668,747. Polymer performance is judged by the minimum dose needed to achieve a particular specific filter resistance (SFR) (the lower the specific filter resistance, the faster the waste can be dewatered), or by the minimum obtainable specific resistance at a particular dose. In any case, the closer the curve lies to zero SFR at zero dose, the better the polymer is considered to be performing.

FIG. 1 shows a comparison of Clarifloc® C-310 with the copolymer of Example 1. Line A, connecting the solid circular points, is for the Example 1 copolymer while line B, connecting the square points, is for Clarifloc® C-310.

Figure 2:
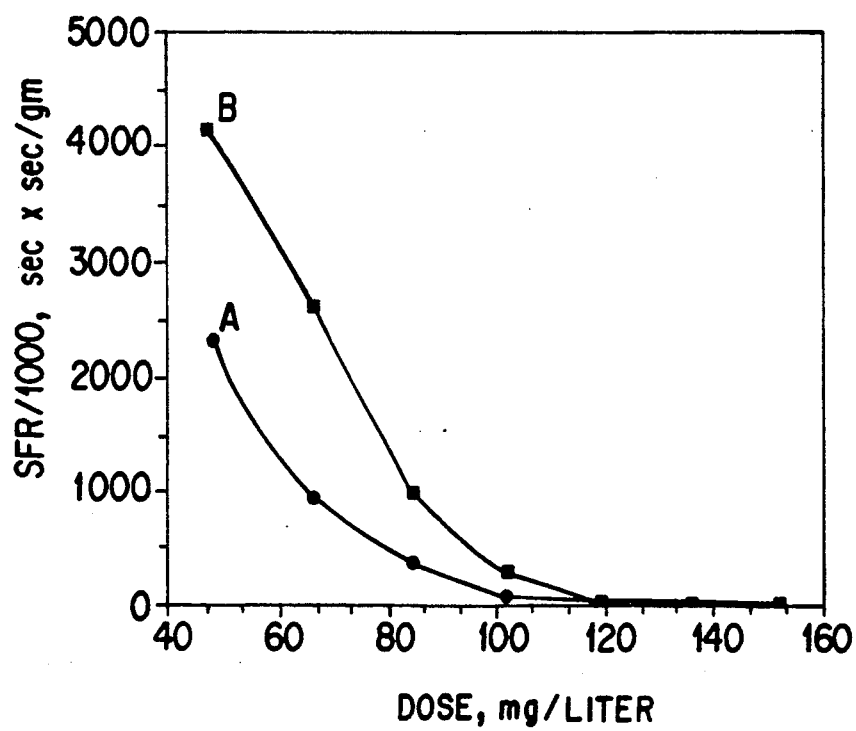

FIG. 2 shows a comparison of Clarifloc® C-310 with the copolymer of Example 2. Line A, connecting the solid circular points, is for the Example 2 copolymer while line B, connecting the square points, is for Clarifloc® C-310.

Figure 3:
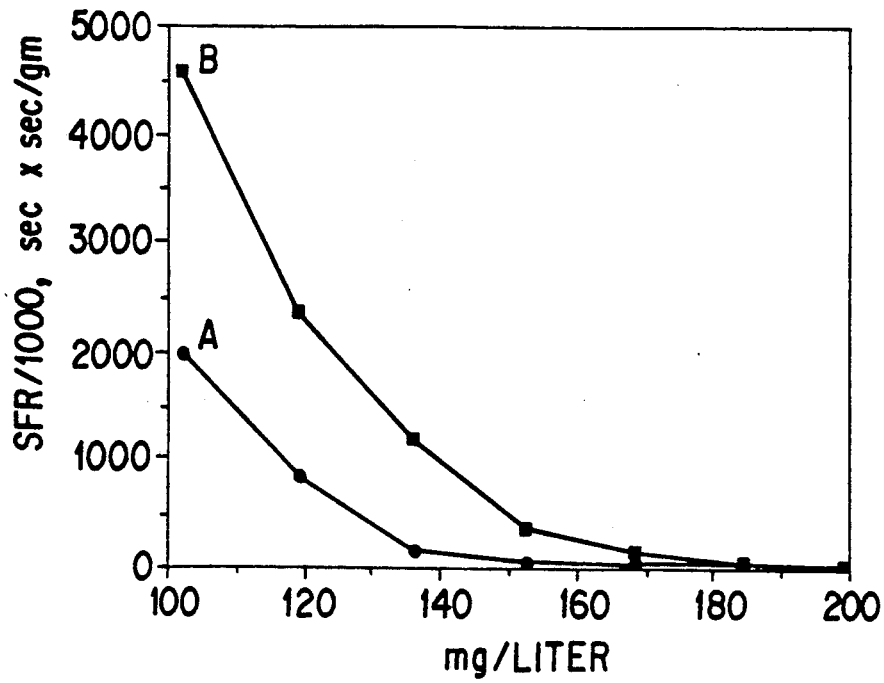

FIG. 3 shows a comparison of Clarifloc® C-330 with the copolymer of Example 3. Line A, connecting the solid circular points, is for the Example 3 copolymer while line B connecting the square points, is for Clarifloc® C-330.

Figure 4:
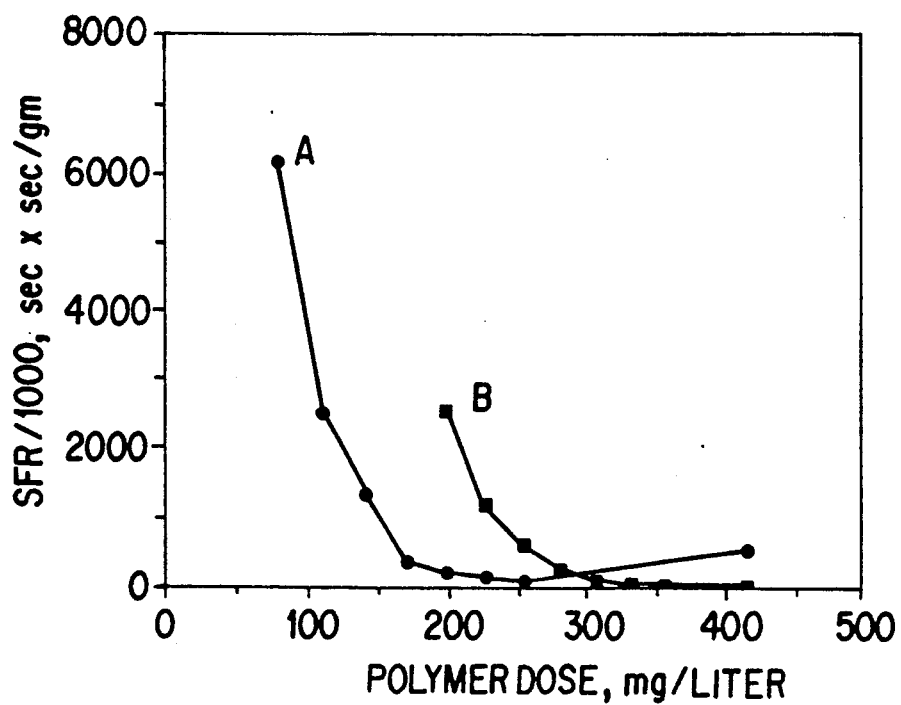

FIG. 4 shows a comparison of Clarifloc® C-320 with the copolymer of Example 4. Line A, connecting the solid circular points, is for the Example 4 copolymer while line B, connecting the square points, is for Clarifloc® C-320.

The results shown in FIGS. 1-4 indicate that the present copolymers are superior in the performance to that of commercial products. It is quite apparent that the acrylamide-MAHTAC copolymers disclosed herein are superior waste water treatment agents when compared with state-of-the-art commercial products.

EXAMPLE 9

This Example compares the hydrolysis results of the present MAHTAC to methacryloyloxyethyltrimethylammonium chloride (MAETAC). MAETAC is one of the most commonly commercially used cationic monomers for production of copolymers with acrylamide. Resulting copolymers are of high molecular weight and linearity and are widely used in commercial wastewater treatment applications. However, one of the limitations of MAETAC is its susceptibility to hydrolysis of the ester linkage. This Example illustrates the superiority of the present MAHTAC monomer over MAETAC monomer through the measurement of its hydrolysis rate.

The chemical reaction of interest is:

$$RCO(OR') + OH^- \xrightarrow{K_1} RCO(O^-) + R'OH \quad (1)$$

$$-d[OH^-]/dt = K_1[\text{ester}][OH^-] \quad (2)$$

If the starting concentrations of ester and $OH^-$ are equal at time 0, the above equation can be integrated to the form:

$$1/[OH^-] = K_1 t + 1/[OH^-]_o$$

and thus the rate constant for hydrolysis can be determined simply.

Two experiments are run, one each for MAETAC and for MAHTAC using the following procedure:
1. Prepare 100 ml each of 2 N solutions of cationic monomer and NaOH.
2. Mix together quickly, and measure the solution pH with time.
3. Calculate $[OH^-]$ from the pH.
4. Plot $1/[OH^-]$ vs. t and determine the slope of the line. $K_1$ is the slope.

For MAETAC the 95% confidence interval for the slope is 16.825 to 16.181 and for MAHTAC for the 95% confidence interval is 2.314 to 2.396.

This measurement demonstrates that MAHTAC hydrolyzes about 8 times more slowly than MAETAC, and hence, can form a superior polymer for use in high pH wastewater applications.

EXAMPLE 10

In this example the copolymer of U.S. Pat. No. 3,321,649 and copolymer of this invention are compared for flocculation performance in waste waters.

Comparatives A and B are copolymers of 3-methacryloxy-2-hydroxypropyltrimethylammonium chloride and its isomer and acrylamide, the acrylamide being 55 mole percent of the copolymer. The cationic monomer is prepared by the method described in Example 1 of U.S. Pat. No. 3,329,706, this patent being the parent of U.S. Pat. No. 3,428,617 (Ser. No. 404,963), cited in U.S. Pat. No. 3,321,649 as the method for preparing the monomer. The copolymers with this monomer are then prepared following the method of Example 2 above.

The copolymer of this invention compared in this example, Sample 1, is prepared from the monomer of Example A above using the method of Example 2 above.

Figure 5:
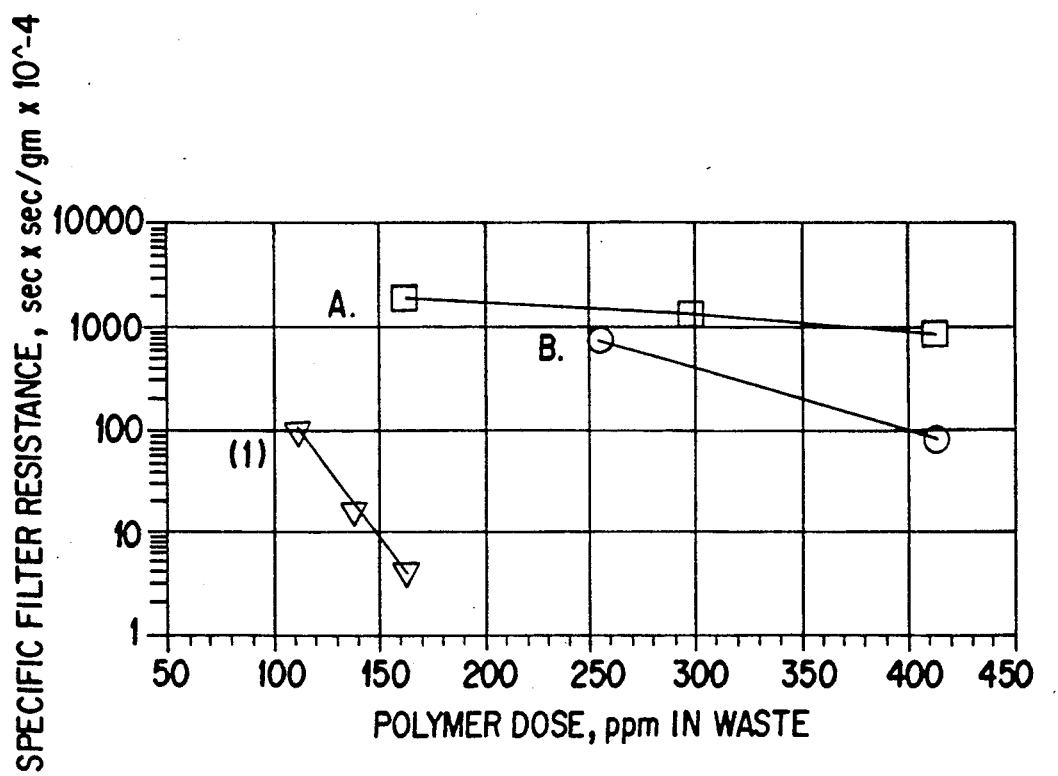

The three copolymers are evaluated for performance in the Specific Filter Resistance test with waste water as set out in Example 8 above. The results of these evaluations are plotted in FIG. 5. The line marked (l), with the connecting triangles, is for Sample 1, the copolymer of this invention. The line marked A, with the connecting squares, is for comparative copolymer A. The line marked B with connected circles, is for comparative copolymer B. The results indicate that the copolymer of this invention is far superior in performance to that of the copolymers of U.S. Pat. No. 3,321,694.

Having described the invention in detail and by reference to preferred embodiments thereof, it will be apparent that modifications and variations are possible without departing from the scope of the invention defined in the appended claims.

We claim:
1. A process comprising the steps of:
   (a) reacting a mixture of 3-halo-2-hydroxypropyl methacrylate and 1-halo-3-hydroxypropyl methacrylate with from 1.0 to 2.0 moles of trialkylamine per mole of the mixture at from about 25° to about 70° C. for a time sufficient to form 3-methacryloyloxy-2-hydroxypropyltrimethylammonium halide and its isomer, 2-methacryloyloxy-3-hydroxypropyltrimethylammonium halide, wherein said reaction occurs in from about 35 to 85% of a nonsolvent for said halide salt mixture;
   (b) precipitating the monomer mixture as the reaction proceeds; and
   (c) polymerizing at least two vinyl monomers wherein one of said monomers is the monomer salt mixture, to form a copolymer having an intrinsic viscosity greater than about 5 dl/g.
2. The process of claim 1 wherein said mixture comprises 3-methacryloyloxy-2-hydroxypropyltrime- thylammonium chloride and 2-methacryloyloxy-3-hydroxypropyltrimethylammonium chloride.

3. The process of claim 1 wherein said copolymer has an intrinsic viscosity greater than about 6 dl/g.

4. The process of claim 1 wherein said copolymer has an intrinsic viscosity greater than about 9 dl/g.

5. The process of claim 1 wherein said copolymer has an intrinsic viscosity greater than about 12 dl/g.

6. The process of claim 1 wherein one of said vinyl monomers is acrylamide.

7. The process of claim 1 wherein said copolymer has in addition to the monomer salt mixture two additional different monomers therein.

8. The process of claim 1 wherein said copolymer has in addition to the monomer salt mixture three additional different monomers therein.

9. The process of claim 1 further comprising the step of separating the precipitated halide monomer from the reaction non-solvent.

10. The process of claim 1 wherein the non-solvent is a solvent for the halohydroxypropyl ester but in which halide salt is only up to about 3% soluble.

11. The process of claim 9 further comprising the step of further purifying the precipitated halide monomer.

12. A process comprising the steps of:
(a) reacting methacrylic acid and epihalohydrin to form a reaction product comprising a mixture of 3-halo-2-hydroxypropyl methacrylate and 1-halo-3-hydroxypropyl methacrylate the molar ratio of acid to epihalohydrin is about 0.5:1.0 to about 1.0:0.5;
(b) reacting said reaction product with a trialkylamine in the presence of a component with an epoxy functional group to yield a monomer mixture of 3-methacryloyloxy-2-hydroxypropyl-trimethylammonium halide salt and 2-methacryloyloxy-3-hydroxypropyltrimethylammonium halide salt, said reaction being carried out in a non-solvent for the monomer mixture;
(c) precipitating the monomer mixture as the reaction proceeds, the monomer being at least 94.9% pure; and
(d) polymerizing at least two vinyl monomers wherein one of said monomers is the monomer mixture salt, to form a copolymer having an intrinsic viscosity greater than about 5 dl/g.

13. The process of claim 12 wherein the methacrylic acid and epihalohydrin are reacted in the presence of a catalyst.

14. The process of claim 12 further comprising the step of separating the precipitated halide monomer from the reaction non-solvent.

15. The process of claim 14 further comprising the step of washing the precipitated halide monomer.

16. The process of claim 12 further comprising the step of further purifying the precipitated halide monomer.

17. The process of claim 12 wherein molar the ratio of said halohydroxypropyl ester to said trimethylamine is about 1.0:1.0 to about 1.0:2.0.

18. A process comprising the steps of:
(a) reacting methacrylic acid and epihalohydrin to form a reaction product comprising a mixture of 3-halo-2-hydroxypropyl methacrylate and 1-halo-3-hydroxypropyl methacrylate the molar ratio of acid to epihalohydrin is about 0.5:1.0 to about 1.0:0.5;
(b) reacting said reaction product with a trialkylamine in the presence of a component with an epoxy functional group to yield the monomer mixture, said reaction being carried out in a non-solvent for the monomer mixture;
(c) precipitating the halide monomer as the reaction proceeds to attain a yield of at least about 98% based on the acid; and
(d) polymerizing at least two vinyl monomers wherein one of said monomers is the monomer mixture salt, to form a copolymer having an intrinsic viscosity greater than about 5 dl/g.

19. The process as recited in claim 18 wherein the molar ratio of said reaction product to said trimethylamine is about 1.0:1.0 to about 1.0:2.0.

20. The process of claim 12 wherein said copolymer has an intrinsic viscosity greater than about 6 dl/g.

21. The process of claim 12 wherein said copolymer has an intrinsic viscosity greater than about 9 dl/g.

22. The process of claim 12 wherein said copolymer has an intrinsic viscosity greater than about 12 dl/g.

* * * * *

UNITED STATES PATENT AND TRADEMARK OFFICE
CERTIFICATE OF CORRECTION

PATENT NO. : 5,132,383

DATED : July 21, 1992

INVENTOR(S) : E. H. Larson et al.

It is certified that error appears in the above-identified patent and that said Letters Patent is hereby corrected as shown below:

On the title page, in the Abstract,
At line 4 thereof, please delete "-2-hydroxypropyltrimethylam-" and insert "-2-hydroxypropyltrialkylam-".
At line 6, please delete "propyltrimethylammonium" and insert "propyltrialkylammonium".
Col 1, line 16, please delete "-2-hydroxypropyltrimethylam-" and insert "-2-hydroxypropyltrialkylam-"
line 18, please delete "3-hydroxypropyltrimethylammonium" and insert "3-hydroxypropyltrialkylammonium"
Col 2, line 21, please delete "-2-hydroxypropyltrimethylam-" and insert "-2-hydroxypropyltrialkylam-"
Col 2, line 23, please delete "propyltrimethylammonium" and insert "propyltrialkylammonium"
Col 2, line 29, please delete "epihalorohydrin" and insert "epihalohydrin".
Col 2, line 39 and line 40, please change the "Cl$^-$" at the end of the formula to "Halide$^-$" (one occurance on each line).
Col 2, line 55, please delete "-2-hydroxypropyltrimethylammonium" and insert "-2-hydroxypropyltrialkylammonium".
Col 2, lines 56/57, please delete "-3-hydroxypropyltrimethylammonium" and insert "-3-hydroxypropyltrialkylammonium".
Col 3, line 14, please delete "hydroxypropyltrimethylammonium" and insert "hydroxypropyltrialkylammonium".
Col 3, line 15, please delete "3-hydroxypropyltrimethylam-" and insert "3-hydroxypropyltrialkylam-".
Col 5, line 40, please delete "moium" and insert "monium".
Col 5, line 67, (a) should be (i)

UNITED STATES PATENT AND TRADEMARK OFFICE
CERTIFICATE OF CORRECTION

PATENT NO. : 5,132,383
DATED : January 14, 1993
INVENTOR(S) : E. H. Larson et al.

It is certified that error appears in the above-identified patent and that said Letters Patent is hereby corrected as shown below:

<u>Col 6, line 21</u>, please delete "permaganate" and insert "permanganate"

<u>Col 6, line 32</u>, please delete "3-acrylamide-3-" and insert "3-acrylamido-3-".

<u>Col 6, line 40/41</u>, please delete "the benzyl chloride salt of acryloyloxyethyldimethyl amine;" and insert "acryloyloxyethylbenzyldimethylammonium chloride;".

<u>Col 9, line 4</u>, please delete "hydroquinone" and insert "phenol".

<u>Col 9, line 27</u>, please delete "cryloyloxy2-" and insert "cryloyloxy-2-".

<u>Col 10, line 36</u>, after "52", please insert "and Triton N-101".

<u>Claim 1, Col 14, line 56</u>, please delete "-2-hydroxypropyltrimethylammonium" and insert "-2-hydroxypropyltrialkylammonium"

<u>Claim 1, Col 14, line 58</u>, please delete "ypropyltrimethylammonium" and insert "ypropyltrialkylammonium"

<u>Claim 12, Col 15, line 36</u>, please delete "-2-hydroxypropyltrimethylam-" and insert "-2-hydroxypropyltrialkylam-".

<u>Claim 12, Col 15, line 38</u>, please delete "hydroxypropyltrimethylammonium" and insert "hydroxypropyltrialkylammonium".

Signed and Sealed this

Twenty-eighth Day of December, 1993

Attest:

BRUCE LEHMAN

*Attesting Officer*  *Commissioner of Patents and Trademarks*

Disclaimer 5,132,383 — Eric H. Larson, Marcellus; Benjamin Shultes, III, Liverpool; William G. Chiang, Fayetteville, all of N.Y. COPOLYMERS OF 3-METHACRYLOYLOXY-2-HYDROXYPROPYL TRIMETHYLAMMONIUM CHLORIDE MONOMER AND VINYL MONOMER. Patent dated July 21, 1992. Disclaimer filed March 10, 1997, by the assignee, S.N.F.

Hereby enters this disclaimer to all claims of said patent.
*(Official Gazette,* April 29, 1997)